(12) United States Patent
Rimac et al.

(10) Patent No.: US 11,385,944 B2
(45) Date of Patent: Jul. 12, 2022

(54) EVENT HANDLING IN DISTRIBUTED EVENT HANDLING SYSTEMS

(71) Applicant: Nokia Solutions and Networks Oy, Espoo (FI)

(72) Inventors: Ivica Rimac, Remseck (DE); Istemi Ekin Akkus, Heidelberg (DE); Ruichuan Chen, Stuttgart (DE); Manuel Stein, Waiblingen (DE); Volker Hilt, Waiblingen (DE)

(73) Assignee: Nokia Solutions and Networks Oy, Espoo (FI)

( * ) Notice: Subject to any disclaimer, the term of this patent is extended or adjusted under 35 U.S.C. 154(b) by 957 days.

(21) Appl. No.: 15/645,724

(22) Filed: Jul. 10, 2017

(65) Prior Publication Data
US 2019/0012218 A1    Jan. 10, 2019

(51) Int. Cl.
*G06F 9/54* (2006.01)
*G06F 9/48* (2006.01)

(52) U.S. Cl.
CPC ............ *G06F 9/542* (2013.01); *G06F 9/4881* (2013.01); *G06F 9/546* (2013.01); *G06F 2209/548* (2013.01)

(58) Field of Classification Search
CPC .............. G06F 9/542; G06F 16/24565; G06F 16/24568; G06F 16/24573; G06F 2209/5013; G06F 2209/509; G06F 9/5055; G06F 9/546; G06F 9/4881
See application file for complete search history.

(56) References Cited

U.S. PATENT DOCUMENTS

| | | | |
|---|---|---|---|
| 6,393,458 B1 | 5/2002 | Gigliotti | |
| 6,993,771 B1* | 1/2006 | Hasha | G06F 9/542 |
| | | | 719/313 |
| 7,559,065 B1 | 7/2009 | Sosnovsky | |
| 7,694,344 B1 | 4/2010 | Fletcher et al. | |
| 8,001,232 B1 | 8/2011 | Saulpaugh | |
| 8,463,939 B1 | 6/2013 | Galvin | |
| 2003/0007453 A1 | 1/2003 | Ogier et al. | |

(Continued)

FOREIGN PATENT DOCUMENTS

| | | |
|---|---|---|
| EP | 1 107 556 A2 | 6/2001 |
| EP | 3 388 943 A1 | 10/2018 |
| EP | 3 389 222 A1 | 10/2018 |

OTHER PUBLICATIONS

International Search Report and Written Opinion mailed in corresponding PCT/US2018/041268 dated Oct. 11, 2018, 14 pages.

*Primary Examiner* — Dong U Kim
(74) *Attorney, Agent, or Firm* — Tong, Rea, Bentley & Kim, LLC

(57) ABSTRACT

The present disclosure generally discloses an event handling capability configured to support handling of events. The event handling capability may be configured to support handling of events in a distributed event handling system, which may use distributed queuing of events, distributed processing of events, and so forth. The distributed event handling system may be serverless cloud system or other type of distributed event handling system. The event handling capability may be configured to support handling of events in a distributed event handling system based on use of a message bus for queuing of events and based on use of hosts for queuing and processing of events.

12 Claims, 6 Drawing Sheets

(56) References Cited

U.S. PATENT DOCUMENTS

| | | | |
|---|---|---|---|
| 2003/0065856 A1* | 4/2003 | Kagan | G06F 13/387 |
| | | | 710/263 |
| 2004/0019612 A1* | 1/2004 | Tyra | G06F 9/542 |
| 2004/0078440 A1* | 4/2004 | Potter | G06F 9/542 |
| | | | 709/206 |
| 2005/0038801 A1* | 2/2005 | Colrain | G06F 16/21 |
| 2006/0031572 A1* | 2/2006 | Feuerstein | G06F 9/542 |
| | | | 709/238 |
| 2008/0301175 A1* | 12/2008 | Applebaum | G06F 16/24565 |
| 2011/0173359 A1* | 7/2011 | Chakravarty | G06F 9/542 |
| | | | 710/112 |
| 2012/0117223 A1 | 5/2012 | Jennings | |
| 2012/0191856 A1 | 7/2012 | Chen | |
| 2012/0239792 A1 | 9/2012 | Banerjee et al. | |
| 2012/0278815 A1* | 11/2012 | Balko | G06F 9/5055 |
| | | | 719/313 |
| 2013/0036189 A1* | 2/2013 | Stevens, III | H04L 65/1006 |
| | | | 709/217 |
| 2013/0297770 A1 | 11/2013 | Zhang et al. | |
| 2014/0173112 A1 | 6/2014 | Seago et al. | |
| 2016/0034322 A1 | 2/2016 | Braudes | |
| 2016/0105370 A1 | 4/2016 | Mellor | |
| 2017/0118310 A1 | 4/2017 | Gilliard et al. | |
| 2017/0214738 A1* | 7/2017 | Agarwal | H04L 67/1002 |
| 2018/0174578 A1 | 6/2018 | Bangalore | |
| 2018/0324222 A1* | 11/2018 | Carpenter | H04L 67/2809 |

* cited by examiner

EVENT HANDLING IN DISTRIBUTED EVENT HANDLING SYSTEMS

TECHNICAL FIELD

The present disclosure relates generally to network technology and, more particularly but not exclusively, to event handling in event handling systems.

BACKGROUND

Event handling systems may be used to handle various types of events that are associated with various types of services or applications. Event handling systems may be centralized or distributed. Event handling in distributed event handling systems, such as serverless cloud systems and other types of distributed event handling systems, may be complicated.

SUMMARY

The present disclosure generally discloses event handling in event handling systems.

In at least some embodiments, an apparatus is provided. The apparatus is configured to support handling of events by a message bus of an event handling system. The apparatus includes a processor and a memory communicatively connected to the processor. The processor is configured to maintain, by the message bus for an event type, a respective set of event queues for the event type, wherein the event queues for the event type are associated with respective ones of a set of hosts subscribed to the message bus for the event type. The processor is configured to receive, by the message bus for the event type, an event of the event type that is published to the message bus. The processor is configured to store, by the message bus, the event of the event type in one of the event queues for the event type based on respective sets of queue status information associated with the respective event queues. The processor is configured to send, by the message bus, the event of the event type toward one of the hosts subscribed to the message bus for the event type based on a request from the one of the hosts subscribed to the message bus for the event type. In at least some embodiments, a non-transitory computer-readable storage medium stores instructions which, when executed by a computer, cause the computer to perform a corresponding method for supporting handling of events by a message bus of an event handling system. In at least some embodiments, a corresponding method for supporting handling of events by a message bus of an event handling system is provided.

In at least some embodiments, an apparatus is provided. The apparatus is configured to support handling of events by a host of an event handling system. The apparatus includes a processor and a memory communicatively connected to the processor. The processor is configured to subscribe, by the host, to a first event queue of a message bus, the first event queue of the message bus configured to store events of a first event type to be processed by a first event processing function of the host. The processor is configured to subscribe, by the host, to a second event queue of the message bus, the second event queue configured to store events of a second event type to be processed by a second event processing function of the host. The processor is configured to maintain, by the host, a local buffer configured to store events received from the first event queue of the message bus and events received from the second event queue of the message bus. The processor is configured to retrieve, by the host based on a local queuing policy of the host and a local event retrieval condition detected at the host, a retrieved event comprising a first event from the first event queue of the message bus or a second event from the second event queue of the message bus. In at least some embodiments, a non-transitory computer-readable storage medium stores instructions which, when executed by a computer, cause the computer to perform a corresponding method for supporting handling of events by a host of an event handling system. In at least some embodiments, a corresponding method for supporting handling of events by a host of an event handling system is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses an event handling capability configured to support handling of events. The event handling capability may be configured to support handling of events in a distributed event handling system, which may use distributed queuing of events, distributed processing of events, and so forth. The distributed event handling system may be serverless cloud system or other type of distributed event handling system. It will be appreciated that these and various other embodiments and advantages or potential advantages of the event handling capability may be further understood by way of reference to the example event handling system of FIG. 1.

Figure 1:
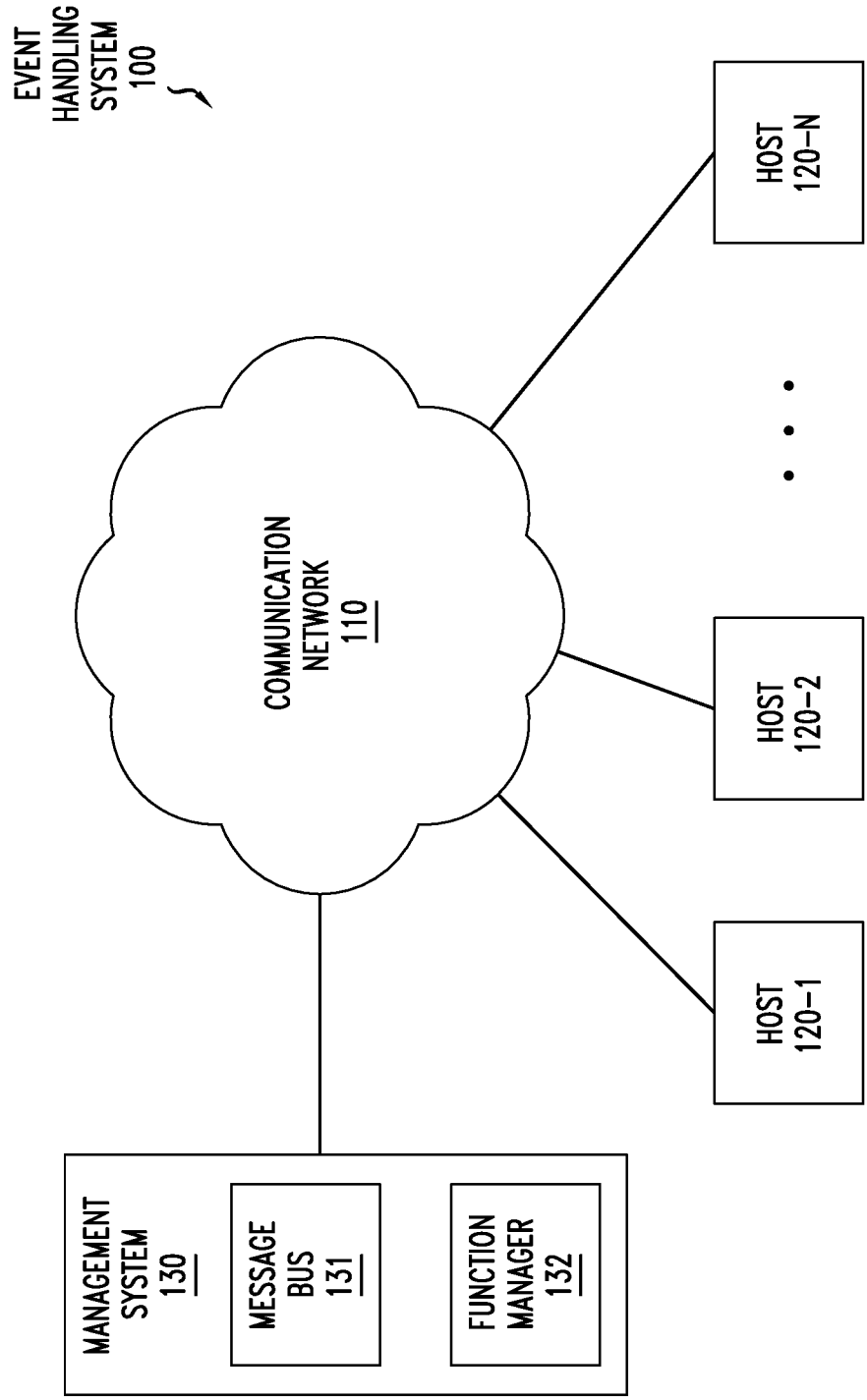
FIG. 1 depicts an event handling system configured to support distributed handling of events.

FIG. 1 depicts an event handling system configured to support distributed handling of events.

The event handling system 100 includes a communication system 110, a set of hosts 120-1-120-N (collectively, hosts 120), and a management system (MS) 130.

The communication system 110 may be any type of communication system configured to support communications of the hosts 120 (e.g., communication of event processing requests entering the event processing system 100 from external sources, communication of events from ones of the hosts 120 operating as publishers of the events, communication of events to ones of the hosts 120 operating as subscribers to the events, communication of event processing responses from hosts 120 based on processing of events by the hosts 120, or the like, as well as various combinations thereof) and communications of the MS 130 (e.g., communication of events being exchanged between hosts 120, communication of management messages associated with scaling of the hosts 120, or the like, as well as various combinations thereof). The communication system 110 may be a communication network (e.g., a wireline network, a wireless network, or the like, as well as various combinations thereof), a messaging system, or the like, as well as various combinations thereof.

The hosts 120 may be any types of hosts configured to support handling of events. The hosts 120 may be configured to be publishers of events, subscribers to events, or both. For example, the hosts may be physical hosts (e.g., servers), virtual hosts (e.g., virtual machines (VMs), virtual containers (VCs), or the like), or the like, as well as various combinations thereof). The hosts 120 may be distributed in various ways (e.g., physical hosts that are geographically distributed, virtual hosts that are distributed across physical servers, or the like, as well as various combinations thereof).

The MS 130 is configured to support distributed handling of events. The MS 130 includes a message bus (MB) 131 configured to control distribution of events across the hosts 120 and a function manager (FM) 132 configured to control scaling of hosts 120 supporting processing of events. The MB 131 may be configured to control distribution of events across the hosts 120 based on monitoring of queues of the MB 131 that are used to distribute events across the hosts 120, where the dynamics of the queues of the MB 131 that are used to distribute events across the hosts 120 may be based on backpressure resulting at the MB 131 from local handling of respective queues on the respective hosts 120 (e.g., each of the hosts 120 is able to locally and independently determine its level of participation in processing of events in a manner that enables the MB 131 to intelligently control distribution of events across the hosts 120 without the use of explicit feedback from the hosts 120). The FM 132 may be configured to control scaling of hosts 120 supporting processing of events based on feedback from the MB 131, supporting scale out and scale in of hosts 120 for event types. It will be appreciated that, although primarily presented with respect to embodiments in which the MB 131 and the FM 132 are part of a particular element (namely, MS 130), the MB 131 and the FM 132 may be standalone elements, may be distributed across various elements, or the like, as well as various combinations thereof.

The event handling system 100 may be a serverless cloud system. In a serverless cloud system, which also may be referred to as a function-as-a-service (FaaS) cloud resources are utilized based on demand from the applications and services with the clients being charged based on the amount of resources consumed and with the management of those resources being transparent or substantially transparent to the clients. In a serverless cloud system, the applications or services generally follow an event-driven programming model in which the event processing functions of the application or service are triggered by events within the serverless cloud system (e.g., a specific web browsing action by an end user, uploading of an image to a storage server, or the like). In a serverless cloud system, the handling of a request to the application or service in order to provide an associated response from the application or service may be based on a graph of event processing functions that is configured to handle respective events associated with providing the response to the request, where the graph of event processing functions may be distributed across the resources in various ways. For example, the event processing functions may be distributed across hosts 120 in various ways, such that the hosts 120 may exchange events in order to support completion of the response to the request (e.g., an output based on processing of an event by an event processing function of a host 120 may be provided as an input event to be processed by that host 120 and/or one or more other hosts 120). It will be appreciated that the event handling system 100 may be any other suitable type of event handling system in which events may be processed (e.g., a traditional cloud system in which clients request virtual resources to be used to handle processing of events or the like); however, various embodiments of the event handling capability are primarily presented herein within the context of a serverless cloud system.

The event handling system 100 is configured to support distributed handling of events. The events may be events of one or more applications or services supported by the event handling system 100. The events may be external arriving at the event handling system 100 from one or more external source of the events (e.g., requests from clients, requests from network devices, or the like), internal events generated within the event handling system 100 by one or more hosts 120 of the event handling system 100 (e.g., as discussed above, outputs by hosts 120 based on processing of events by event processing functions of the hosts 120 may be inputs, or events, to be processed by hosts 120), or the like, as well as various combinations thereof. The events may include events of one or more event types (e.g., multiple event types associated with respective applications or services, multiple event types supported by a given application or service, or the like, as well as various combinations thereof). For example, where the event handling system 100 supports a database service, events of a first event type may be requests to retrieve data from the database and events of a second event type may be requests to write data in the database. For example, where the event handling system supports a web browsing service, events may include external events (e.g., requests from clients) and internal events (e.g., requests for respective pieces of information to be assembled in order to return associated responses to the clients and processing to assemble the respective pieces of information in order to return associated responses to the clients). It will be appreciated that the event handling system 100 may be configured to handle various other types of events, applications or services, or the like, as well as various combinations thereof.

It will be appreciated that the event handling system 100, although primarily presented as being organized in a particular manner, may be organized in various other ways (e.g., using other numbers, types, or arrangements of communication systems, using other numbers, types, or arrangement of hosts, or the like, as well as various combinations thereof).

Figure 2:
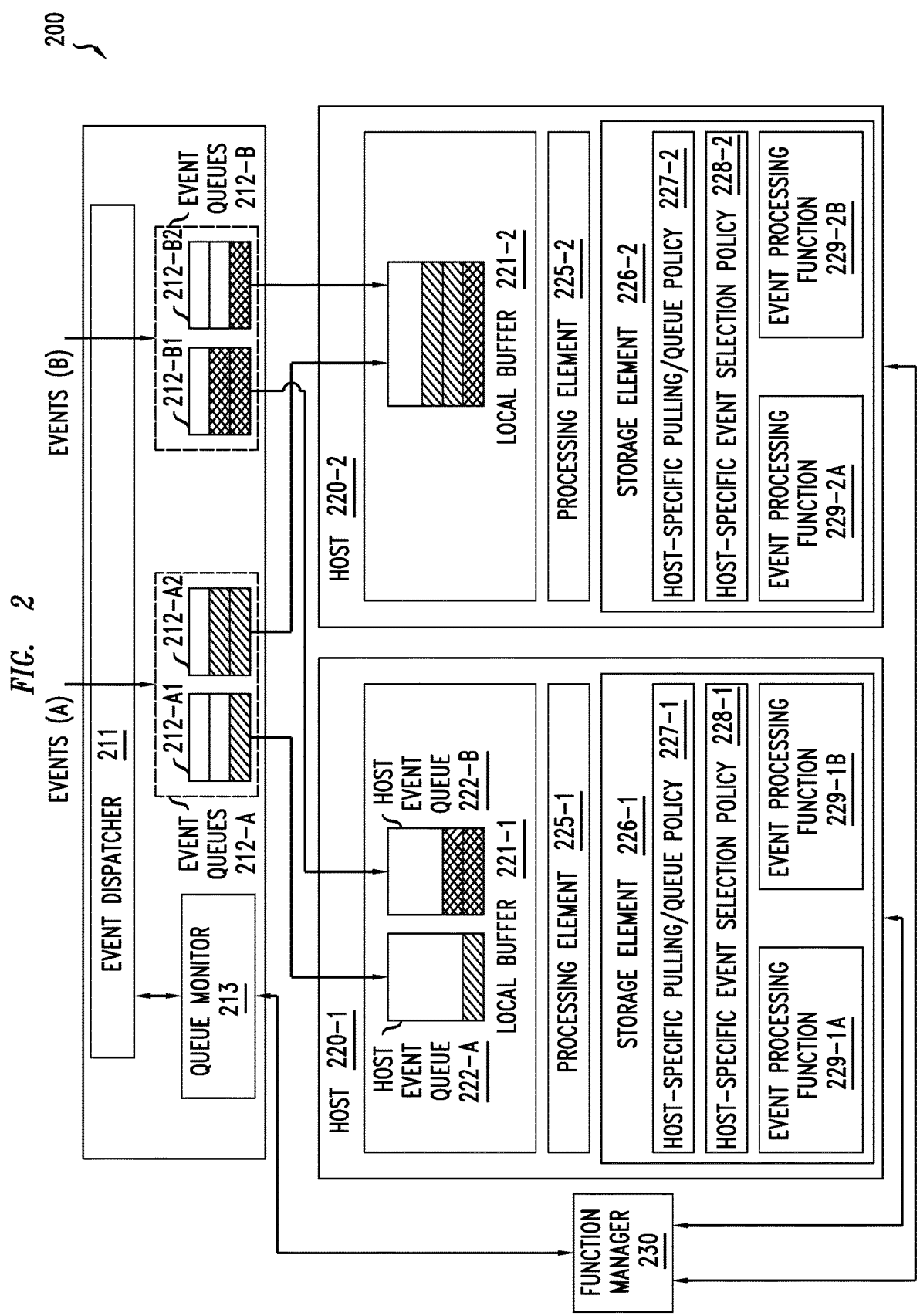
FIG. 2 depicts an event handling system configured to support distributed handling of events.

FIG. 2 depicts an event handling system configured to support distributed handling of events.

The event handling system 200 is configured to support handling of events. The event handling system 200 is depicted as being associated with a single cloud node or cloud location; however, the event handling system 200 may be associated with multiple cloud nodes or cloud locations.

The event handling system 200 is configured to support handling of two event types (primarily referred to herein as event type A and event type B). The two event types may be associated with a common service or application supported by the event handling system 200 (e.g., the service or application may require or support handling of the two event types), may be associated with two respective services or applications supported by the event handling system 200 (e.g., a first service or application requires or supports handling of events of event type A and a second service or application requires or supports handling of events of event type B), may be associated with multiple services or applications supported by the event handling system 200 (e.g., each service or application may require or support handling of events of one or more of the event types), or the like, as well as various combinations thereof. It will be appreciated that the event handling system, although primarily presented with respect to handling of two event types, may be configured to handle any number of event types for any number of services or applications.

The event handling system 200 includes a message bus (MB) 210, a pair of hosts 220-1 and 220-2 (collectively, hosts 220), and a function manager (FM) 230. It will be appreciated that, although only two hosts 220 are depicted, fewer or more hosts 220 may be used (and, further that the number of hosts 220 used may be controlled dynamically). The MB 210 is configured to support queueing of events for the hosts 220 while the events are awaiting processing by the hosts 220. The hosts 220 are configured to subscribe to the MB 210 to receive events from the MB 210. The hosts 220 are configured to receive events from the MB 210 and process the events from the MB 210. The FM 230 is configured to control configuration and scaling of the hosts 220 for supporting processing of events.

The MB 210 is configured to manage events that are awaiting processing by the hosts 220. The MB 210 is configured to receive events that are to be processed by the hosts 220. The MB 210 may receive events based on publication of the events to the MB 210 (e.g., by hosts 220, by one or more other hosts (not presented in FIG. 2), by one or more other sources of events (not presented in FIG. 2), or the like, as well as various combinations thereof). The MB 210 is configured to provide events to the hosts 220 responsive to requests by the hosts 220 to pull the events to the host 220.

The MB 210 includes an event dispatcher (ED) 211, a set of event queues (EQs) 212 (collectively, EQs 212), and a queue monitor (QM) 213.

The ED 211 is configured to receive events and dispatch the events to the EQs 212 for storage in the EQs 212 while the events await processing by the hosts 220. The ED 211 may receive events based on publication of the events to the MB 210. The ED 211 may be configured to determine queuing of events in the EQs 212. The ED 211 may be configured to determine queuing of events in the EQs 212 based on event type information of the events that are received (e.g., an event of an event type is queued within one of the EQs 212 of that event type). The ED 211 may be configured to determine queuing of events in the EQs 212 based on queue status information of the EQs 212 that is received from the QM 213. The queue status information may include various metrics which may be determined by the QM 213 based on monitoring of the EQs 212 by the QM 213. For example, the queue status information for an EQ 212 may include one or more of a queue length (L) of the EQ 212, an arrival rate ($\lambda$) of the EQ 212, a departure rate ($\mu$) of the EQ 212, an expected queue waiting time (E(dt)) for an arriving event at the EQ 212, a change of a queue length (L) of the EQ 212 over a time interval (dL/dt), or the like, as well as various combinations thereof. The ED 211 may be configured to receive an event, determine an event type of the event, and determine queuing of the event in the EQs 212 based on the queue status information of the EQs 212 configured to store events of that event type (as discussed further below, EQs 212 correspond to combinations of event types and hosts).

The ED 211 may be configured to queue events in the EQs 212 based on various portions or combinations of the queue status information of the EQs 212 which may be determined based on monitoring of the EQs 212 by QM 213. For example, the ED 211 may be configured to queue an event based on queue lengths (L) of the EQs 212 that are associated with the event type of that event (e.g., ED 211, for an event of a particular event type, may be configured to dispatch the event to one of the EQs 212, associated with that event type, having a shortest queue length (L)). For example, the ED 211 may be configured to queue an event based on expected queue waiting times (E(dt)) of the EQs 212 that are associated with the event type of that event (e.g., ED 211, for an event of a particular event type, may be configured to dispatch the event to one of the EQs 212, associated with that event type, having a shortest expected queue waiting time (E(dt)). The ED 211 may be configured to queue events in the EQs 212 based on various other portions or combinations of the queue status information of the EQs 212 which may be determined based on monitoring of the EQs 212 by QM 213.

The ED 211 may be configured to queue an event based on queue scores of the EQs 212 that are associated with the event type of that event. The ED 211 may be configured to determine queue scores for the EQs 212 of an event type based on various portions or combinations of the queue status information of the EQs 212, respectively. The queue scores for the EQs 212 of an event type may be configured to enable the ED 211 to select an EQ 212 having a longer queue length over an EQ 212 having a shorter queue length when the queue length of the EQ 212 having the longer queue length and the queue length of the EQ 212 having the shorter queue length are changing at different rates (e.g., where the EQ 212 having the shorter queue length is draining more slowly than the EQ 212 having the longer queue length). The ED 211 may be configured to compute the queue score (S) of an EQ 212 based on the queue length (L) of the EQ 212 and the arrival rate ($\lambda$) of the EQ 212. The ED 211 may be configured to compute the queue score (S) of an EQ 212 based on the queue length (L) of the EQ 212 and the departure rate ($\mu$) of the EQ 212. For example, the ED 211 may be configured to compute the queue score (S) of an EQ 212 using exponentially weighted moving averages of queue length (L) and departure rate ($\mu$) as follows: S=EWMA($\mu$)/EWMA(L), in which case the queue score is inversely proportional to an estimated waiting time of the event in the EQ 212. It will be appreciated that, although primarily discussed with respect to embodiments in which EWMA is used for smoothing, other types of averaging functions may be used for smoothing. The ED 211 may be configured to compute the queue scores of the EQs 212 based on various other portions or combinations of the queue status information of the EQs 212 which may be determined based on monitoring of the EQs 212 by QM 213 (e.g., using one or more of a queue length (L) of the EQ 212, an arrival rate ($\lambda$) of the EQ 212, a departure rate ($\mu$) of the EQ 212, an expected queue waiting time (E(dt)) for an arriving event at the EQ 212, a change of a queue length (L) of the EQ 212 over a time interval (dL/dt), or the like, as well as various combinations thereof).

The ED 211 may be configured to support various other functions for receiving events and dispatching the events to the EQs 212 for storage in the EQs 212 while the events await processing by the hosts 220.

The EQs 212 are configured to receive events from the ED 211 and to store the events while the events await processing by hosts 220. The EQs 212 are configured to allow for addressing based on a combination of event type and host. Namely, the set of EQs 212 includes, for each of the event types, a respective EQ 212 for each of the hosts 220 that is subscribed to handle events of that respective event type. More specifically, the set of EQs 212 includes (1) a first pair of EQs 212-A1 and 212-A2 for event type A (collectively, EQs 212-A for event type A), where the EQ 212-A1 is maintained by the MB 210 for queuing events of event type A for host 220-1 and the EQ 212-A2 is maintained by the MB 210 for queuing events of event type A for host 220-2 and (2) a second pair of EQs 212-B1 and 212-B2 for event type B (collectively, EQs 212-B for event type B), where the EQ 212-B1 is maintained by the MB 210 for queuing events of event type B for host 220-1 and the EQ 212-B2 is maintained by the MB 210 for queuing events of event type B for host 220-2. The EQs 212 are configured to provide queued events to the hosts 220 responsive to requests from the hosts 220 (e.g., host 220-1 may request events of event type A from EQ 212-A1 and may request events of event type B from EQ 212-B1 and host 220-2 may request events of event type A from EQ 212-A2 and may request events of event type B from EQ 212-B2). It will be appreciated that, although primarily presented with respect to a situation in which both of the hosts 220 are subscribed to handle both of the event types, each of the hosts 220 may be subscribed to handle one or more event types, the hosts 220 may be subscribed to handle different sets of event types (e.g., host 220-1 may be subscribed to handle events of event type A and event type B whereas host 220-2 may be subscribed to handle events of event type B only), or the like, as well as various combinations thereof.

The QM 213 is configured to monitor the EQs 212 for use in supporting handling of events (e.g., for supporting ED 211 in controlling distribution of events to the EQs 212, for supporting FM 230 in controlling scaling of the hosts 220 for supporting processing of events, or the like, as well as various combinations thereof). The QM 213 may be configured to, for each of the EQs 212, determine queue status information of the EQ 212 based on monitoring of the EQ 212 (e.g., monitoring the queue length (L) of the EQ 212, monitoring the manner in which events move through the EQ 212 (e.g., monitoring the arrival rate ($\lambda$) of events to the EQ 212, monitoring the departure rate ($\mu$) of events from the EQ 212, or both), or the like, as well as various combinations thereof). The queue status information for an EQ 212 may include a queue length (L) of the EQ 212, an arrival rate ($\lambda$) of events to the EQ 212, a departure rate ($\mu$) of events from the EQ 212, an expected queue waiting time (E(dt)) for an arriving event at the EQ 212, a change of a queue length (L) of the EQ 212 over a time interval (dL/dt), or the like, as well as various combinations thereof. The QM 213 may be configured to compute an expected queue waiting time (E(dt)) for an arriving event at an EQ 212 by assuming that the estimated departure rate ($\mu$) of the EQ 212 is not changing significantly before the event leaves the EQ 212: $E(dt)=L/\mu$. The QM 213, assuming or under certain conditions, may be configured to estimate a queue status parameter based on monitoring and measurement of other queue status parameters (e.g., assuming that the event arrival and departure rates change only slowly so that both are approximately constant over a short time interval dt, then it is possible to measure the change of queue length dL over the same interval dt and relate the metrics as follows: $dL/dt=\lambda-\mu$ (such that, by measuring two of the three values, the third value may be estimated)). The QM 213 may be configured to determine various other types of queue status information for the EQs 212 based on monitoring of the EQs 212. The QM 213 may be configured to provide the queue status information of the EQs 212 to the ED 211 for use in controlling queueing of events in the EQs 212. The QM 213 may be configured to provide the queue status information of the EQs 212 to the FM 230 for use in determining scaling of the hosts 220. The QM 213 also may be configured to determine per-host queuing information for the hosts 220 (e.g., over the sets of EQs 212 associated with the hosts 220) and provide the per-host queuing information to the FM 230 for use in determining scaling of the hosts 220.

The hosts 220 are configured to support handling of events. The hosts 220 are configured to support configuration of the hosts 220 to support event handling (e.g., obtaining event processing function capabilities for respective event types to be supported by the respective hosts 220, subscribing to event types to be supported by the respective hosts 220, configuring the hosts 220 to be able to store events to be processed at the hosts 220, or the like, as well as various combinations thereof), pull events from the MB 210 for event types supported by the respective hosts 220, queue the events pulled from the MB 210 for event types supported by the respective hosts 220, and process the events pulled from the MB 210 for event types supported by the respective hosts 220.

The hosts 220 include respective sets of elements configured to enable the hosts 220 to support handling of events. The hosts 220 include respective event buffers 221 (illustratively, the host 220-1 includes an event buffer 221-1 and host 220-2 includes an event buffer 221-2, which are local buffers local to the hosts 220-1 and 220-2, respectively) configured to store events retrieved by the hosts 220 for processing by the hosts 220, respectively. The hosts 220 include respective processing elements 225 (illustratively, the host 220-1 includes a processing element 225-1 and the host 220-2 includes a processing element 225-2) configured to enable the hosts 220 to provide various functions discussed herein (e.g., configuration of the hosts 220 to support event handling, pulling events from the MB 210 for event types supported by the respective hosts 220, queuing the events pulled from the MB 210 for event types supported by the respective hosts 220, processing the events pulled from the MB 210 for event types supported by the respective hosts 220, or the like, as well as various combinations thereof). The hosts 220 include respective storage elements 226 (illustratively, the host 220-1 includes a storage element 226-1 and the host 220-2 includes a storage element 226-2) storing host-specific event pulling/queuing policies 227 of the hosts 220 (illustratively, the storage element 226-1 of host 220-1 stores a host-specific event pulling/queuing policy 227-1 of the host 220-1 and the storage element 226-2 of host 220-2 stores a host-specific event pulling/queuing policy 227-2 of the host 220-2), host-specific event selection policies 228 (illustratively, the storage element 226-1 of host 220-1 stores a host-specific event selection policy 228-1 of the host 220-1 and the storage element 226-2 of host 220-2 stores a host-specific event selection policy 228-2 of the host 220-2), and event processing functions 229 (illustratively, the storage element 226-1 of the host 220-1 stores an event processing function 229-1A configured to be executed by the processing element 225-1 of the host 220-1 to process events of event type A and an event processing function 229-1B configured to be executed by the processing element 225-1 of the host 220-1 to process events of event type B and the storage element 226-2 of the host 220-2 stores an event processing function 229-2A configured to be executed by the processing element 225-2 of the host 220-2 to process events of event type A and an event processing function 229-2B configured to be executed by the processing element 225-2 of the host 220-2 to process events of event type B). The operation of the hosts 220 in supporting handling of events received from MB 210 is discussed further below.

The hosts 220 are configured to support configuration of the hosts 220 to support event handling. A host 220 may be configured to support event handling for events of a particular event type by obtaining the event processing function 229 that is configured to support processing of events of the particular event type, subscribing to the MB 210 for the particular event type such that the host 220 may retrieve events of the particular event type from MB 210 based on the host-specific event pulling/queuing policy 227 of the host 220, configuring the event buffer 221 of the host 220 to support storage of events of the particular event type at the host 220, or the like, as well as various combinations thereof. A host 220 may be configured to support event handling for events of a particular event type responsive to a request by the FM 230 for the host 220 to handle events of the particular event type. It is noted that the various functions used to configure a host 220 to support event handling for events of a particular event type may be performed with various timings (e.g., serially, contemporaneously, or the like, responsive to various conditions, or the like, as well as various combinations thereof. For example, a host 220 may, responsive to a request by the FM 230 for the host 220 to handle events of a particular event type, obtain the event processing function 229 that is configured to support processing of events of the particular event type and subscribe to the MB 210 for the particular event type such that the host 220 may retrieve events of the particular event type from MB 210. For example, a host 220 may obtain the event processing function 229 that is configured to support processing of events of the particular event type responsive to a request by the FM 230 for the host 220 to handle events of the particular event type, subscribe to receive events of the particular event type from MB 210 responsive to a determination that the host 220 has obtained the event processing function 229 that is configured to support processing of events of the particular event type, and so forth. For example, a host 220 may obtain the event processing function 229 that is configured to support processing of events of the particular event type responsive to a request by the FM 230 for the host 220 to handle events of the particular event type, configure the event buffer 221 of the host 220 to support storage of events of the particular event type at the host 220 responsive to a determination that the host 220 has obtained the event processing function 229 that is configured to support processing of events of the particular event type, subscribe to receive events of the particular event type from MB 210 responsive to a determination that the host 220 has configured the event buffer 221 of the host 220 to support storage of events of the particular event type at the host 220, and so forth. It will be appreciated that configuration of a host 220 to support event handling may be performed in other ways (e.g., using various other timings, responsive to various other conditions, or the like, as well as various combinations thereof).

The hosts 220 are configured to pull events from the MB 210 and queue events pulled from the MB 210. The hosts 220 may be configured to locally control pulling/queuing of events from the EQs 212 of the MB 210 subscribed to by the hosts 220. The hosts 220 may be configured to locally control pulling/queuing of events from the EQs 212 of the MB 210 subscribed to by the hosts 220 based on the host-specific event pulling/queuing policies 227 of the hosts 220, respectively. The host-specific event pulling/queuing policies 227, as presented in FIG. 2, may be different for the hosts 220. Namely, as presented in FIG. 2, (1) the host 220-1 uses an event buffer 221-1 that includes a pair of host event queues (HEQs) 222-A and 222-B (collectively, HEQs 222) configured to store events of event type A and events of event type B, respectively and (2) the host 220-2 uses an event buffer 221-2 that is implemented as a first-in-first-out (FIFO) buffer configured to store events of event type A and events of event type B. The host-specific event pulling/queuing policies 227, although omitted from FIG. 2 for purposes of clarity, may be the same for the hosts 220. The hosts 220 may be configured to locally control pulling/queuing of events from the EQs 212 of the MB 210 subscribed to by the hosts 220 based on local event retrieval conditions detected at the hosts 220. For example, for a given host 220, the local event retrieval condition(s) detected at the host 220 may include detection that a current load at the host 220 satisfies a threshold, detection of a characteristic(s) of events already pulled from the MB 210 by the host 220 or events available to be pulled from the MB 210 by the host 220, detection of one or more capabilities of the host 220, or the like, as well as various combinations thereof. The local event retrieval conditions detected at the hosts 220 may be detected based on host-specific information available at the hosts 220, respectively. For example, the host-specific information available at the hosts 220 may include current load levels at the hosts 220, one or more characteristics of events already pulled from the MB 210 by the hosts 220 or events available to be pulled from the MB 220 by the hosts 220, or the like, as well as various combinations thereof. The hosts 220 may be configured to locally control pulling/queuing of events from the EQs 212 of the MB 210 subscribed to by the hosts 220 based on local event retrieval conditions detected at the hosts 220 using various combinations of local event retrieval conditions, host-specific information, or the like, as well as various combinations thereof. For example, a host 220 may decide to pull memory-hungry events from MB 210 when the host 220 is CPU bottlenecked, may decide to pull CPU-hungry events from the MB 210 when the host 220 is memory bottlenecked, or the like. In this manner, decisions by the host 220 regarding pulling/queuing of events from the EQs 212 of the MB 210 remain local to the hosts 220 such that they do not need to be communicated between the hosts 220 and, thus, do not require any communication or coordination between the hosts 220 for this purpose. It is noted that local decisions of the hosts 220 in pulling/queuing events from the MB 210 produce backpressures on the EQs 212 in the MB 210, which are monitored and summarized in the queue status information of the EQs 212 (e.g., the queue lengths and associated queue dynamics).

The hosts 220 are configured to process events queued at the hosts 220. The hosts 220 process events by retrieving events from the event buffers 221 based on the host-specific event selection policies 228 and processing the events using the event processing functions 229.

The hosts 220 are configured to retrieve events from the event buffers 221 for processing by the hosts 220. The hosts 220 may be configured to locally control selection of events from the event buffers 221 of the hosts 220. The hosts 220 may be configured to locally control selection of events from the event buffers 221 of the hosts 220 based on the host-specific event selection policies 228 of the hosts 220, respectively. The host-specific event selection policies 228 may be different for the hosts 220, may be the same for the hosts 220, or the like. The host-specific event selection policies 228 of the host 220 may be at least partially based on the host-specific event pulling/queuing policies 227 of the hosts (e.g., the manner in which events are selected for processing at host 220-1 may be at least partially based on the fact that the host 220-1 maintains separate HEQs 222 for queuing of different event types, the manner in which events are selected for processing at host 220-2 may be at least partially based on the fact that the host 220-2 maintains a single FIFO queue for queuing of different event types, and so forth). For example, host 220-1 may be configured to select between processing events of event type A and processing events of event type B since the host 220-1 uses the event buffer 221-1 that includes the HEQs 222-A and 222-B configured to store events of event type A and events of event type B, respectively. For example, host 220-2 may be configured to process events of event type A and events of event type B based on the ordering of the events within the event buffer 221-2 since the event buffer 221-2 is implemented as a FIFO buffer. The hosts 220 may be configured to locally control selection of events from the event buffers 221 of the hosts 220 based on host-specific information available at the hosts 220, such as host resources available at the hosts 220, host resources needed for processing events at the hosts 220, one or more characteristics of events awaiting processing by the hosts 220, or the like, as well as various combinations thereof. For example, a host 220 may decide to process memory-hungry events when the host 220 is CPU bottlenecked, may decide to process CPU-hungry events when the host 220 is memory bottlenecked, or the like. The hosts 220 may be configured to locally control selection of events from the event buffers 221 of the hosts 220 based on the host-specific event selection policies 228 and local event selection conditions detected at the hosts 220 (e.g., a current load at a host being below a threshold, detection of a particular characteristic of events awaiting processing by the hosts 220, or the like, as well as various combinations thereof). In this manner, decisions by the host 220 regarding processing of events from MB 210 at the hosts 220 remain local to the hosts 220 such that they do not need to be communicated between the hosts 220 and, thus, do not require any communication or coordination between the hosts 220 for this purpose.

The hosts 220 are configured to process the events, retrieved from the event buffers 221, using the event processing functions 229 available on the hosts 220. For example, the host 220-1 is configured to (1) process events of event type A, which are retrieved from the HEQ 222-A of host 220-1 based on the host-specific event selection policy 228-1 of the host 220-1, based on execution of the event processing function 229-1A by the processing element 225-1 of the host 220-1 and (2) process events of event type B, which are retrieved from the HEQ 222-B of host 220-1 based on the host-specific event selection policy 228-1 of the host 220-1, based on execution of the event processing function 229-1B by the processing element 225-1 of the host 220-1. Similarly, for example, the host 220-2 is configured to (1) process events of event type A, which are retrieved from the event buffer 221-2 of host 220-2 based on the host-specific event selection policy 228-2 of the host 220-2, based on execution of the event processing function 229-2A by the processing element 225-2 of the host 220-2 and (2) process events of event type B, which are retrieved from the event buffer 221-2 of host 220-2 based on the host-specific event selection policy 228-2 of the host 220-2, based on execution of the event processing function 229-2B by the processing element 225-2 of the host 220-2. The processing of the events by the hosts 220 may trigger various related actions (e.g., storage or sending of state information, storage or sending of processing results, storage or sending of processing responses, or the like, as well as various combinations thereof) which may vary based on various factors (e.g., the service or application being supported, event types of the events, or the like, as well as various combinations thereof. The hosts 220 are configured to control processing of events locally at the hosts 220 such that the processing of events by the hosts 220 does not require any communication or coordination between the hosts 220. The hosts 220 each may be configured to monitor their own resource usages locally and to apply allocation policies suitable for utilizing the local resources of the hosts 220, with the monitoring and allocation of any particular host 220 being independent of other hosts 220. In this manner, decisions by the hosts 220 regarding processing of events at the hosts 220 remain local to the hosts 220 such that they do not need to be communicated between the hosts 220 and, thus, do not require any communication or coordination between the hosts 220 for this purpose.

The FM 230 is configured to control configuration and scaling of the hosts 220 for supporting processing of events. The FM 230 may be configured to control configuration of the hosts 220 for supporting processing of events (e.g., requesting or instructing hosts 220 to obtain event processing functions 229 for particular event types, to subscribe to the MB 210 for particular event types, or the like, as well as various combinations thereof). The scaling may include scale out or scale in of the hosts 220. The scaling of hosts 220 may include configuration of existing hosts 220, instantiation of new hosts 220, termination of existing hosts 220, or the like, as well as various combinations thereof. The configuration of existing hosts 220 may include configuring a host 220 to support processing of an event type (e.g., requesting or instructing the host 220 to obtain the event processing function 229 for the event type and to subscribe to receive events of that event type from the MB 210 such that the MB 210 instantiates an EQ 212 for that host 220 for that event type), configuring a host 220 to stop supporting processing of an event type (e.g., requesting or instructing the host 220 to remove the event processing function 229 for the event type and to unsubscribe from receiving events of that event type from the MB 210 such that the MB 210 removes the EQ 212 for that host 220 for that event type), or the like, as well as various combinations thereof. The FM 230 may be configured to control scaling of the hosts 220 for supporting processing of events based on information received form the QM 213 of MB 210 (e.g., queue status information of the EQs 212, per-host queuing information of the hosts 220, or the like, as well as various combinations thereof).

It will be appreciated that the event handling system 200, although primarily presented as being organized in a particular manner, may be organized in various other ways (e.g., using other numbers, types, or arrangements of hosts or host capabilities, message bus capabilities, or the like, as well as various combinations thereof).

Figure 3:
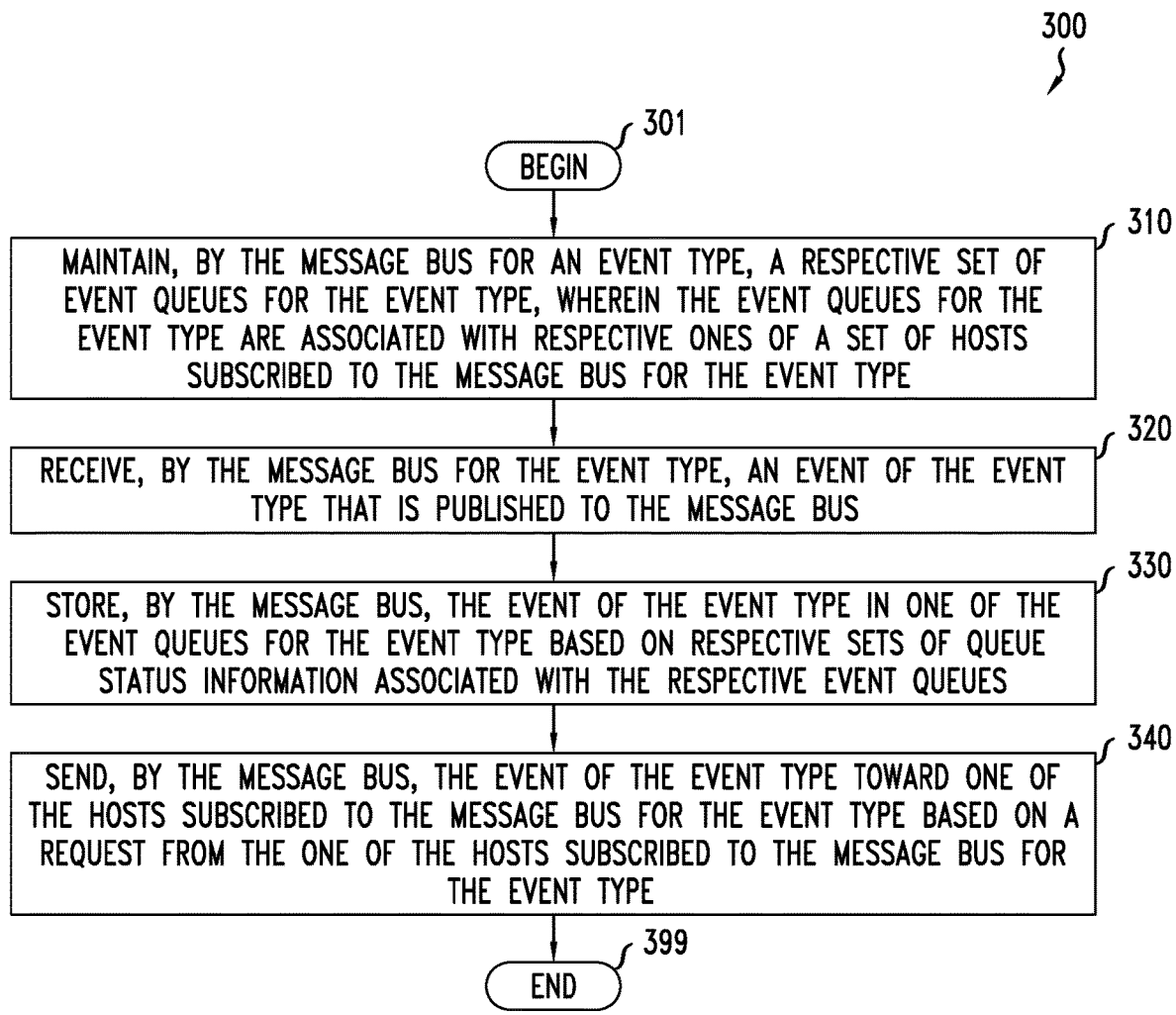
FIG. 3 depicts an embodiment of a method for use by a message bus to support event handling.

FIG. 3 depicts an embodiment of a method for use by a message bus to support event handling. It will be appreciated that, although primarily presented herein as being performed serially, at least a portion of the functions of method 300 may be performed contemporaneously or in a different order than as presented in FIG. 3.

At block 301, method 300 begins.

At block 310, maintain, by the message bus for an event type, a respective set of event queues for the event type, wherein the event queues for the event type are associated with respective ones of a set of hosts subscribed to the message bus for the event type.

At block 320, receive, by the message bus for the event type, an event of the event type that is published to the message bus.

At block 330, store, by the message bus, the event of the event type in one of the event queues for the event type based on respective sets of queue status information associated with the respective event queues.

At block 340, send, by the message bus, the event of the event type toward one of the hosts subscribed to the message bus for the event type based on a request from the one of the hosts subscribed to the message bus for the event type.

At block 399, method 300 ends.

Figure 4:
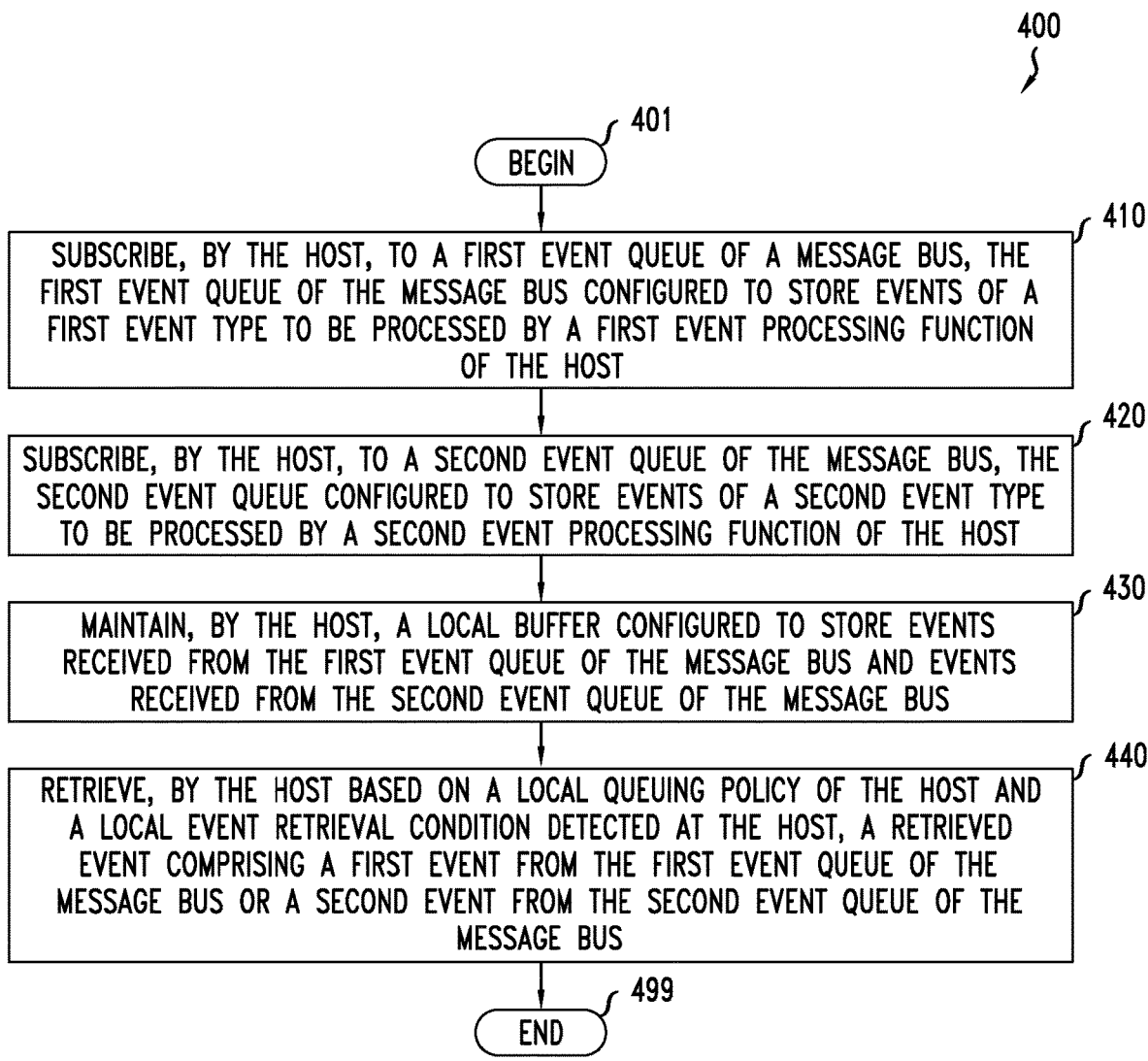
FIG. 4 depicts an embodiment of a method for use by a host to support event handling.

FIG. 4 depicts an embodiment of a method for use by a host to support event handling. It will be appreciated that, although primarily presented herein as being performed serially, at least a portion of the functions of method 400 may be performed contemporaneously or in a different order than as presented in FIG. 4.

At block 401, method 400 begins.

At block 410, subscribe, by the host, to a first event queue of a message bus, the first event queue of the message bus configured to store events of a first event type to be processed by a first event processing function of the host.

At block 420, subscribe, by the host, to a second event queue of the message bus, the second event queue configured to store events of a second event type to be processed by a second event processing function of the host.

At block 430, maintain, by the host, a local buffer configured to store events received from the first event queue of the message bus and events received from the second event queue of the message bus.

At block 440, retrieve, by the host based on a local queuing policy of the host and a local event retrieval condition detected at the host, a retrieved event comprising a first event from the first event queue of the message bus or a second event from the second event queue of the message bus.

At block 499, method 400 ends.

It will be appreciated that, although primarily presented with respect to embodiments in which the event handling system includes a centralized message bus (illustratively, MB 210 of event handling system 200), in at least some embodiments the event handling system may include a distributed message bus. An example of an event handling system using a distributed message bus is presented in FIG. 5.

Figure 5:
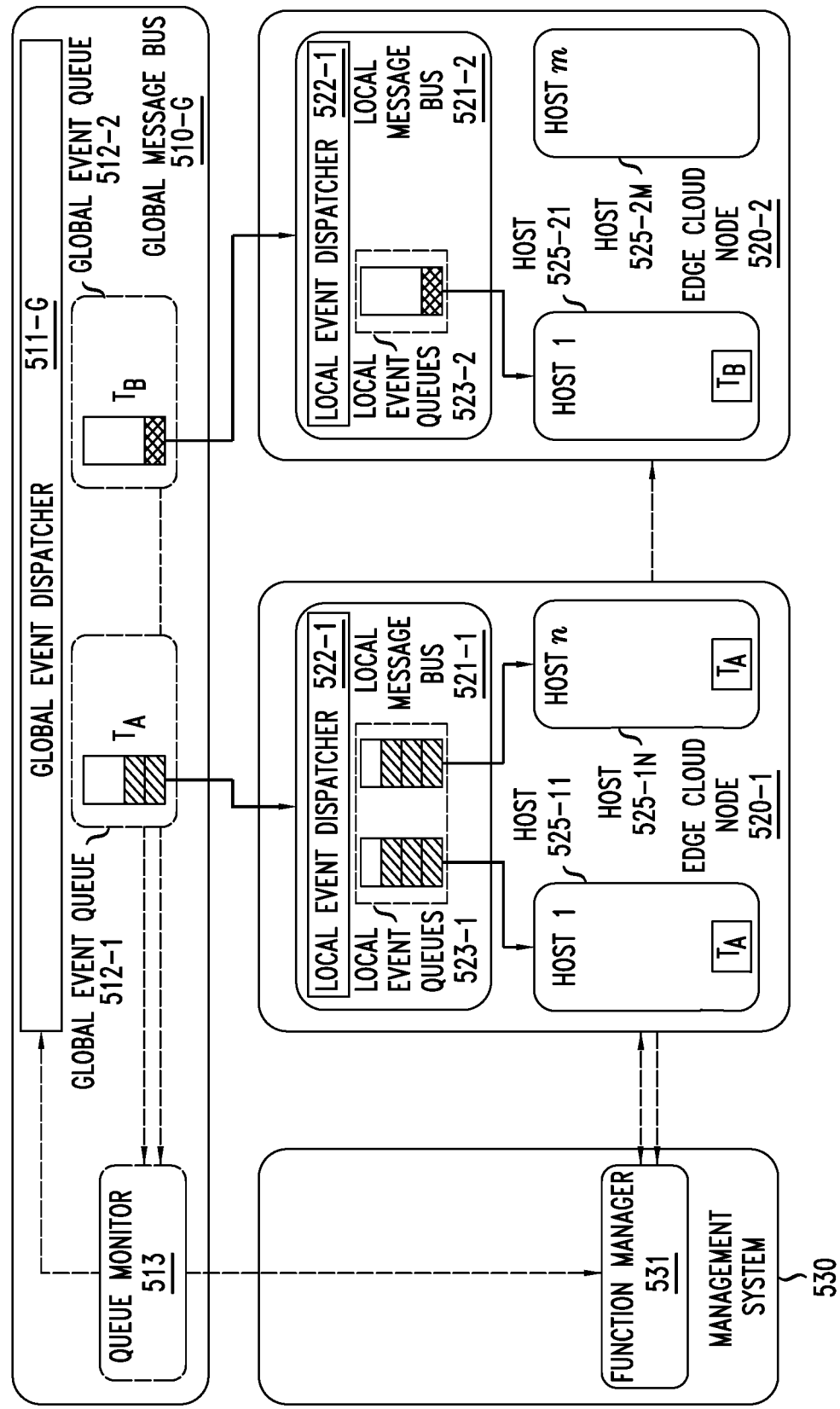
FIG. 5 depicts an event handling system configured to support distributed handling of events based on a distributed message bus.

FIG. 5 depicts an event handling system configured to support distributed handling of events based on a distributed message bus.

The event handling system 500 is configured to support handling of events. The event handling system 500 is depicted as being associated with two cloud nodes or cloud locations; however, the event handling system 500 may be associated with a single cloud node or cloud location.

The event handling system 500 is configured to support handling of two event types (primarily referred to herein as event type A and event type B).

The event handling system 500 includes a global message bus (GMB) 510-G, a pair of edge cloud nodes (ECNs) 520-1 and 520-2 (collectively, ECNs 520), and a management system (MS) 530. It will be appreciated that, although only two ECNs 520 are depicted, fewer or more ECNs 520 may be used.

The GMB 510-G includes a global event dispatcher (GED) 511-G, a set of global event queues (GEQs) 512 (collectively, GEQs 512), and a queue monitor (QM) 513.

The ECNs 520 each include a local message bus (LMB) 521 (illustratively, ECN 520-1 includes an LMB 521-1 and ECN 520-2 includes an LMB 521-2) and a respective plurality of hosts 525 (illustratively, ENC 520-1 includes a plurality of hosts 525-11-525-1N and ECN 520-2 includes a plurality of hosts 525-21-525-2M). The LMBs 521 each include a local event dispatcher (LED) 522 (illustratively, LMB 521-1 includes an LED 522-1 and LMB 521-2 includes an LED 522-2) and a set of local event queues (LEQs) 523 (illustratively, LMB 521-1 includes a set of LEQs 523-1 and LMB 521-2 includes a set of LEQ 523-2).

The MS 530 includes a function manager 531. It will be appreciated that the MS 530 may be configured to include various other types of managers which may provide various other types of functions.

The GED 511-G is configured to receive events and dispatch the events to the GEQs 512 for storage in the GEQs 512 while the events await transfer to the LMBs 521 of the ECNs 520 and, eventually, processing by the hosts 525 of the ECNs 520. The GED 511-G may be configured to determine queuing of events in the GEQs 512 based on event type information of the events that are received. The GED 511-G may be configured to determine queuing of events in the GEQs 512 based on queue status information of the GEQs 512 that is received from the QM 513 (e.g., queue lengths, event arrival rates, event departure rates, or the like, as well as various combinations thereof). The operation of the GED 511-G in dispatching events to the GEQs 512 may be similar to the operation of ED 211 in dispatching events to the EQs 212 (presented with respect to FIG. 2).

The GEQs 512 are configured to receive events from the GED 511-G and to store the events while the events await transfer to the LMBs 521 of the ECNs 520 and, eventually, processing by hosts 525 of the ECNs 520. The GEQs 512, as presented in FIG. 5, may be configured to allow for addressing based on event type. Namely, the set of GEQs 512 includes, for each of the event types, a respective GEQ 512 for the respective event type (illustratively, the GMB 511-G includes a GEQ 512-1 that stores events of event type A and a GEQ 512-1 that stores events of event type B). The GEQs 512, although omitted from FIG. 5, may be configured to allow for addressing based on a combination of event type and edge cloud node (e.g., the set of GEQs 512 may include, for each of the event types, a respective GEQ 512 for each of the ECNs 520 (and, thus, for each of the LMBs 521 of the ECNs 520) that is subscribed to handle events of that respective event type. The GEQs 512 are configured to provide queued events to the LMBs 521 of the ECNs 520 responsive to requests from the LMBs 521 of the ECNs 520 (e.g., LMB 521-1 of ECN 520-1 may request events of event type A from GEQ 512-1 and LMB 521-2 of ECN 520-2 may request events of event type B from GEQ 512-2). It will be appreciated that, although primarily presented with respect to a situation in which each ECN 520 is only subscribed to handle events of a single event type (namely, ECN 520-1 being subscribed to handle events of event type A and ECN 520-2 being subscribed to handle events of event type B), one or more of the ECNs 520 may be subscribed to handle events of a multiple event types.

The QM 513 is configured to monitor the GEQs 512 for use in supporting handling of events (e.g., for supporting GED 511-G in controlling distribution of events to the GEQs 512, for supporting FM 531 in controlling scaling of the hosts 525 for supporting processing of events, or the like, as well as various combinations thereof). The operation of the QM 513 of GMB 511-G may be similar to the operation of QM 213 of MB 210 (presented with respect to FIG. 2).

The ECNs 520 are configured to support queuing and processing of events. The events are queues by the LMBs 521 of the ECNs 520 and the events are processed by the hosts 525 of the ECNs 520.

The LMBs 521 of the ECNs 520 are configured to manage events that are awaiting processing by the hosts 525 of the ECNs 520, respectively. The LMBs 521 of the ECNs 520 are configured to receive events that are to be processed by the hosts 525 of the ECNs 520 and to provide the events to the hosts 525 of the ECNs 520 for processing by the hosts 525 of the ECNs 520.

The LMBs 521 of the ECNs 520 are configured to subscribe to the GMB 511-G in order to retrieve events from the GEQs 512 of the GMB 511-G (illustratively, the LMB 521-1 is subscribed to GMB 511-G for event type A while the LMB 521-2 is subscribed to GMB 511-G for event type B). The LMBs 521 of the ECNs 520 may be configured to subscribe to the GMB 511-G in order to retrieve events from the GEQs 512 of the GMB 511-G under the control of the FM 531 (e.g., based on a request or instruction for an ECN 520 to support handling of events of the event type, based on a request or instruction for one or more of the hosts 525 of an ECN 520 to support handling of events of the event type, or the like). The operation of the LMBs 521 of the ECNs 520 in pulling events from the GMB 511-G may be similar to the operation of the hosts 220 in pulling events from the EQs 212 of the MB 210 (e.g., based on local policies of the ECNs 520, based on local conditions at the ECNs 520, or the like, as well as various combinations thereof).

The LEDs 522 of the LMBs 521 are configured to receive events from the GEQs 512 of the GMB 511-G and to dispatch the events to the LEQs 523 for storage in the LEQs 523 while the events await transfer to the hosts 525 of the ECNs 520 to be processed by the hosts 525 of the ECNs 520. The LEDs 522 may be configured to determine queuing of events in the LEQs 523 based on queue status information of the LEQs 523 (e.g., queue lengths, event arrival rates, event departure rates, or the like, as well as various combinations thereof), host status information associated with hosts 525 subscribed to or otherwise associated with the LEDs 522, or the like, as well as various combinations thereof. The operation of the LEDs 522 in dispatching events to the LEQs 523 may be similar to the operation of ED 211 in dispatching events to the EQs 212 (presented with respect to FIG. 2).

The LEQs 523 are configured to receive events from the LEDs 522 and to store the events while the events await transfer to the hosts 525 of the ECNs 520 to be processed by the hosts 525 of the ECNs 520. The LEQs 523, as presented in FIG. 5, may be configured to allow for addressing based on hosts 525. Namely, the set of LEQs 523 includes, for each of the hosts 525 subscribed to retrieve events from the LMB 521, a respective LEQ 523 for the respective host (illustratively, the LMB 521-1 of ECN 520-1 includes a set of LEQs 523-1 that includes an LEQ 523-1 for host 525-11 and an LEQ 523-1 for host 525-1N and the LMB 521-2 of ECN 520-2 includes a set of LEQs 523-2 that includes an LEQ 523-2 for host 525-21). The LEQs 523 are configured to provide queued events to the hosts 525 responsive to requests from the hosts 525 (e.g., host 525-11 may request events of event type A from the LEQ 523-1 to which the host 525-11 is subscribed, host 525-1N may request events of event type A from the LEQ 523-1 to which the host 525-1N is subscribed, and the host 525-21 may request events of event type B from the LEQ 523-2 to which the host 525-21 is subscribed).

The host 525 are configured to support handing of events. The hosts 525 may be configured to support configuration of the hosts 525 to support event handling (e.g., obtaining event processing functions for respective event types to be supported by the respective hosts 525, subscribing to event types to be supported by the respective hosts 525, configuring the hosts 525 to be able to store events to be processed at the hosts 525, or the like, as well as various combinations thereof), pull events from the LMBs 521 for event types supposed by the respective hosts 525, queue the events pulled from the LMBs 521 for event types supported by the respective hosts 525, and process the events pulled from the LMBs 521 for event types supported by the respective hosts 525. The details of the host 525 are omitted for purposes of clarity; however, it will be appreciated that the hosts 525 may be configured in a manner similar to the hosts 220 (presented with respect to FIG. 2). It will be appreciated that the operation of the hosts 525 may be similar to the operation of the hosts 220 (presented with respect to FIG. 2); however, rather than pulling events from a centralized message bus, the hosts 525 pull events based on a distributed message bus (e.g., pulling events from local message buses of the distributed message bus where the local message buses pull events from the global message bus of the distributed message bus).

The GMB 511-G and LMBs 521 cooperate to provide a distributed message bus for the hosts 525. In the distributed message bus, events are hierarchically passed from the GMB 511-G to the LMBs 521.

The GMB 511-G may be configured to maintain a variable number of GEQs 512 for an event type or a constant number of GEQs 512 for an event type (e.g., subsets of which may be mapped to different ECNs 520). For example, where the number of GEQs 512 is constant (e.g., assuming 10 total queues) and events of event type A are only being handled by the ECN 520-1 then, based on a decision to scale out handling of event type A to ECN 520-2, the mapping of the ten GEQs 512 may be changed such that x GEQs 512 are mapped to ECN 520-1 and 10-x GEQs 512 are mapped to ECN 520-2. It is noted that this control over scaling of the GMB 511-G may be provided by the FM 531 or other suitable element.

The LMBs 521 each may be configured to maintain a variable number of LEQs 523 for an event type or a constant number of LEQs 523 for an event type (e.g., subsets of which may be mapped to different hosts 525 or subsets of hosts 525). For example, where the number of LEQs 523-2 of ECN 520-2 is variable and events of event type B are only being handled by the host 525-21 of the ECN 520-2 then, based on a decision to scale out handling of event type B to host 525-2M of ECN 520-2, the set of LEQs 512 may be changed such that an additional LEQ 523-2 is instantiated on LMB 521-2 of ECN 520-2 for host 525-2M. It is noted that this control over scaling of the LMB 521 may be provided locally at the ECN 520-2.

The ECNs 520 may be configured to control configuration and scaling of the hosts 525, for supporting processing of events, locally within the ECNs 520, respectively. The ECNs 520 may be configured to control configuration of the hosts 525 of the ECNs 520 for supporting processing of events (e.g., requesting or instructing hosts 525 to obtain event processing functions for particular event types, to subscribe to LMBs 521 for particular event types, or the like, as well as various combinations thereof). The scaling may include scale out or scale in. The scaling of hosts 525 may include configuration of existing hosts 525, instantiation of new hosts 525, termination of existing hosts 525, or the like, as well as various combinations thereof. The localized operation of each of the ECNs 520 in controlling configuration and scaling of the respective hosts 525 of the ECNs 520, for supporting processing of events by the respective hosts 525 of the ECNs 520, may be similar to the operation of the FM 230 in controlling configuration and scaling of the hosts 220 for supporting processing of events (presented in FIG. 2).

The FM 531 is configured to control deployment of event processing functions to ECNs 520. The FM 531 may be configured to control the deployment of event processing functions to ECNs 520 based on information from the QM 513. The FM 531 may be configured to support configuration and scaling of the hosts 525 for supporting processing of events (e.g., requesting or instructing hosts 525 to obtain event processing functions for particular event types, to subscribe to LMBs 521 for particular event types, or the like, as well as various combinations thereof) if centralized control over configuration and scaling of the hosts 525 is to be used in addition to localized control over configuration and scaling of the hosts 525 by the respective ECNs 520. The FM 531 is configured to provide various other management functions.

It will be appreciated that the event handling system 500, although primarily presented as being organized in a particular manner, may be organized in various other ways (e.g., using other numbers, types, or arrangements of hosts or host capabilities, message bus capabilities, or the like, as well as various combinations thereof).

Various embodiments of the event handling capability, as discussed above, may be configured to solve various problems associated with handling of events for a service or application in a distributed event handling system.

Various embodiments of the event handling capability may be configured to support event handling based on distribution of information collection and decision making between the hosts and a message bus including a global message queue that supports the hosts. The individual behaviors of the hosts are reflected in the status and the dynamics of the queues in the message bus, manifesting in different arrival and departure rates and backlogs of the individual queues. This information is available to various elements of the system and may be used for solving various problems as discussed herein.

Various embodiments of the event handling capability may be configured to solve a first problem of determining scaling (e.g., scale up and scale down) of the number of hosts participating in the event handling for the service or application in the distributed event handling system. In general, only hosts that have the software for the service or application can support the service or application and execute functions for the service or application. Installing software for the service or application generally consumes small, but non-negligible, amount of resources in the event handling system. As such, installing software for all services or applications on every host is not feasible, however, limiting the installation of software to too few hosts limits the amount of resources that are available for the service or application (which can lead to degradation of performance of the service or application (e.g., jitter in latency) and, thus, a decrease in quality-of-experience (QoE) of the end users). In view of such competing considerations, selecting the appropriate number of hosts on which software for the service or application is to be installed may be challenging. In at least some embodiments, this first problem may be solved by (1) considering the backlog and the changes in backlog of the queues in the message bus of a particular event type and (2) initiating scaling for the event type based on the queue status information where the scaling may include scale out (e.g., if the queues for a particular event are backlogged and draining relatively slowly then this is taken as an indicator to request installation of the corresponding functions on an additional host to increase the processing capacity (which will increase the performance of the service or application for which the event type is supposed) or scale in (e.g., if the queues for a particular event type are lightly loaded and drain relatively quickly then this is taken an indicator to request that the function be uninstalled from one (or several) hosts). It will be appreciated that various other embodiments presented herein may solve or contribute to solving the first problem.

Various embodiments of the event handling capability may be configured to solve a second problem of determining distribution of events of the service or application to hosts that support the service or application in the distributed event handling system. In general, the distribution of events of the service or application to hosts that support the service or application should be determined such that none of the hosts are overloaded and such that the hosts have the resources needed to process events efficiently. However, since hosts may support multiple services or applications, the resource availability at the hosts for event processing may depend on the workloads of the various services or applications supported by the hosts (which may vary over time). In view of such competing considerations, determining distribution of events of the service or application to hosts that support the service or application may be challenging. In at least some embodiments, this second problem may be solved by (1) considering the backlog and the changes in backlog of the queues in the message bus of a particular event type by calculating a score on these two metrics for each queue where the score increases as the conditions of a queue status improve (e.g., decreasing queue length and/or increasing drain rate) and (2) dispatching incoming events to the queue that has the highest score (which will minimize the latencies for the corresponding service or application for which events of the event type are being handled). It will be appreciated that various other embodiments presented herein may solve or contribute to solving the second problem.

Various embodiments of the event handling capability may provide various other advantages or potential advantages.

Figure 6:
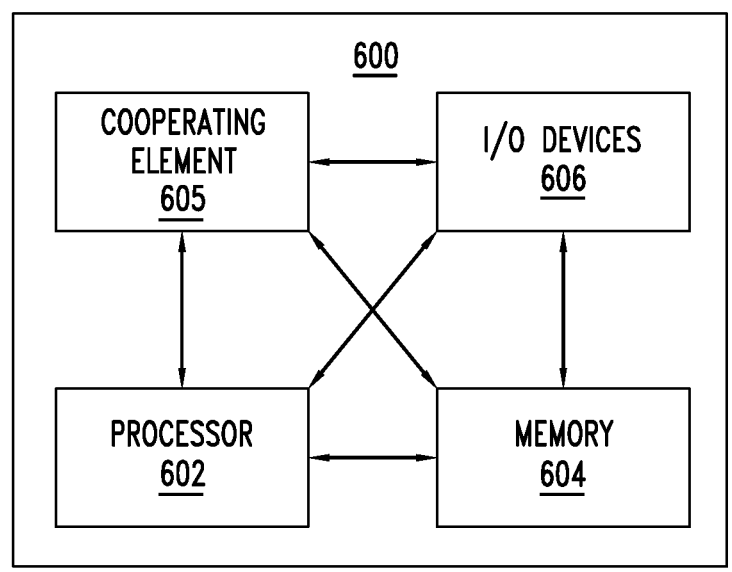
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of one or more processor cores, or the like) and a memory 604 (e.g., a random access memory (RAM), a read only memory (ROM), or the like). The processor 602 and the memory 604 are communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of an element of CN 110, a host 120 or a portion thereof, the MS 130 or a portion thereof, the MB 131 or a portion thereof, the FM 132 or a portion thereof, the MB 210 or a portion thereof, a host 220 or a portion thereof, the FM 230 or a portion thereof, GMB 511-G or a portion thereof, an ECN 520 or a portion thereof, an LED 521 or a portion thereof, a host 525 or a portion thereof, the MS 530 or a portion thereof, or the like, as well as various combinations thereof.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus configured to support handling of events by a host of an event handling system, the apparatus comprising:
a processor and a memory communicatively connected to the processor, the processor configured to:
subscribe, by the host, to a first event queue of a message bus, the first event queue of the message bus configured to store events of a first event type to be processed by a first event processing function of the host;
subscribe, by the host, to a second event queue of the message bus, the second event queue configured to store events of a second event type to be processed by a second event processing function of the host;
maintain, by the host, a local buffer configured to store events received from the first event queue of the message bus and events received from the second event queue of the message bus; and
retrieve, by the host based on a local queuing policy of the host and a local event retrieval condition detected at the host, a retrieved event comprising a first event from the first event queue of the message bus or a second event from the second event queue of the message bus.

2. The apparatus of claim 1, wherein the processor is configured to subscribe to the first event queue of the message bus based on a determination that the host supports the first event processing function.

3. The apparatus of claim 1, wherein the processor is configured to subscribe to the second event queue of the message bus based on a determination that the host supports the second event processing function.

4. The apparatus of claim 1, wherein the processor is configured to receive scaling requests from a function manager, wherein the processor is configured to subscribe to the first event queue of the message bus based on a first request from the function manager and to subscribe to the second event queue of the message bus based on a second request from the function manager.

5. The apparatus of claim 1, wherein the local buffer of the host comprises a first host event queue configured to store events received from the first event queue of the message bus and a second host event queue configured to store events received from the second event queue of the message bus.

6. The apparatus of claim 1, wherein the local buffer of the host comprises a first-in-first-out buffer configured to store events received from the first event queue of the message bus and events received from the second event queue of the message bus.

7. The apparatus of claim 1, wherein the processor is configured to:
select, by the host from the local buffer configured to store events received from the first event queue of the message bus and events received from the second event queue of the message bus based on a local event selection condition detected at the host, a selected event; and
process the selected event.

8. The apparatus of claim 7, wherein the selected event is an event of the first event type, wherein the selected event is processed by the host using the first event processing function of the host.

9. The apparatus of claim 7, wherein the selected event is an event of the second event type, wherein the selected event is processed by the host using the second event processing function of the host.

10. The apparatus of claim 1, wherein the processor is configured to:
detect a request for the host to stop handling events of the first event type;
unsubscribe from the first event queue of the message bus based on the request for the host to stop handling events of the first event type;

process, by the host using the first event processing function of the host, any events of the local buffer of the host of the first event type; and initiate removal of the first event processing function from the host.

11. The apparatus of claim 1, wherein the processor is configured to:

detect a request for the host to stop handling events of the second event type;

unsubscribe from the second event queue of the message bus based on the request for the host to stop handling events of the second event type;

process, by the host using the second event processing function of the host, any events of the local buffer of the host of the second event type; and initiate removal of the second event processing function from the host.

12. A method to support handling of events by a host of an event handling system, the method comprising:

subscribing, by the host, to a first event queue of a message bus, the first event queue of the message bus configured to store events of a first event type to be processed by a first event processing function of the host;

subscribing, by the host, to a second event queue of the message bus, the second event queue configured to store events of a second event type to be processed by a second event processing function of the host;

maintaining, by the host, a local buffer configured to store events received from the first event queue of the message bus and events received from the second event queue of the message bus; and retrieving, by the host based on a local queuing policy of the host and a local event retrieval condition detected at the host, a retrieved event comprising a first event from the first event queue of the message bus or a second event from the second event queue of the message bus.

* * * * *